(12) United States Patent
Jeong

(10) Patent No.: US 10,293,861 B2
(45) Date of Patent: May 21, 2019

(54) REINFORCEMENT UNIT OF SIDE SILL FOR ELECTRIC VEHICLES

(71) Applicants: Hyundai Motor Company, Seoul (KR); Kia Motors Corporation, Seoul (KR)

(72) Inventor: SeungMin Jeong, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 123 days.

(21) Appl. No.: 15/607,585

(22) Filed: May 29, 2017

(65) Prior Publication Data
US 2018/0134320 A1    May 17, 2018

(30) Foreign Application Priority Data
Nov. 16, 2016  (KR) .................. 10-2016-0152865

(51) Int. Cl.
*B62D 25/02* (2006.01)
*B62D 25/20* (2006.01)
*B62D 21/15* (2006.01)

(52) U.S. Cl.
CPC ......... *B62D 25/025* (2013.01); *B62D 21/157* (2013.01); *B62D 25/2036* (2013.01); *B62D 21/15* (2013.01); *B62D 25/02* (2013.01)

(58) Field of Classification Search
CPC . B62D 25/025; B62D 21/157; B62D 25/2036
USPC ............................................. 296/209, 187.12
See application file for complete search history.

(56) References Cited

U.S. PATENT DOCUMENTS

| | | | | |
|---|---|---|---|---|
| 2012/0161472 | A1* | 6/2012 | Rawlinson | B60K 1/04 296/187.08 |
| 2013/0229030 | A1* | 9/2013 | Yamaguchi | B60K 1/04 296/193.07 |
| 2015/0145288 | A1* | 5/2015 | Kellner | B62D 25/025 296/209 |
| 2016/0257346 | A1* | 9/2016 | Wu | B62D 21/157 |
| 2017/0015361 | A1* | 1/2017 | Koch | B62D 25/025 |
| 2017/0144706 | A1* | 5/2017 | Bach | B62D 25/025 |
| 2018/0148099 | A1* | 5/2018 | Ayukawa | B62D 21/155 |
| 2018/0236863 | A1* | 8/2018 | Kawabe | B60K 1/04 |
| 2018/0312197 | A1* | 11/2018 | Takahashi | B62D 21/02 |
| 2018/0312200 | A1* | 11/2018 | Kawase | B62D 25/2036 |

FOREIGN PATENT DOCUMENTS

KR    20110035696    4/2011

* cited by examiner

*Primary Examiner* — Jason S Morrow
(74) *Attorney, Agent, or Firm* — Slater Matsil, LLP

(57) ABSTRACT

A reinforcement unit of a side sill for an electric vehicle is disclosed. The side sill includes side sill inner panels and side sill outer panels that are respectively provided under opposite ends of a center floor panel. The reinforcement unit includes a reinforcement pipe member provided between the side sill inner panel and the side sill outer panel along a length direction of a vehicle body, and a connection apparatus comprising a plurality of fixing brackets and a plurality of pipe nuts. The connection apparatus fixes the reinforcement pipe member to the side sill inner panel.

20 Claims, 6 Drawing Sheets

REINFORCEMENT UNIT OF SIDE SILL FOR ELECTRIC VEHICLES

CROSS-REFERENCE TO RELATED APPLICATIONS

This application claims priority to and the benefit of Korean Patent Application No. 10-2016-0152865 filed in the Korean Intellectual Property Office on Nov. 16, 2016, the entire contents of which are incorporated herein by reference.

TECHNICAL FIELD

The present invention relates generally to a reinforcement unit of a side sill for an electric vehicle, and, in particular embodiments, to a reinforcement unit of a side sill for an electric vehicle for improvement of side impact performance.

BACKGROUND

Generally, an electric vehicle is driven by an electric motor supplied with energy from a battery and driven.

The electric vehicle may, for example, include a plug-in hybrid electric vehicle (PHEV), a battery electric vehicle (BEV), a fuel cell electric vehicle (FCEV), and the like.

A high-voltage battery pack (hereinafter, referred to as a battery pack) is installed in such an electric vehicle, and the electric vehicle is driven using a driving motor as a power source. The driving motor operates by receiving power from the battery pack.

The battery pack has a large volume and heavy weight, and thus a vehicle needs an enough installation space for installation of the battery pack in the vehicle.

Such a battery pack is provided in a lower portion of a center floor panel that is disposed between side sills of an under body of the vehicle.

For example, the battery pack is mounted with the side sill to the lower portion of the center floor panel through various mounting units such as a bracket and the like.

However, an under body for an electric vehicle according to a conventional art requires an additional mounting unit to mount a battery case to the lower portion of the center floor panel together with the side sill through a battery cross member, and accordingly, the number of parts and the number of assembling processes for assembling the mounting unit are increased, thereby causing an increase of the weight of the vehicle body.

Thus, the under body for the electric vehicle needs a space for parts such as the mounting unit for installation of the battery pack and a space for forming a gap for suppressing generation of noise between the battery case and the center floor panel, and accordingly, alignment of the battery panel cannot be freely designed and an increase of capacity of the battery pack is limited.

Further, in the under body for the electric vehicle according to the conventional art, the battery pack is simply supported by the lower portion of the center floor panel through the side sill together with the battery cross member, and thus when a side collision occurs, safety and durability with respect to an impact load cannot be sufficiently assured, thereby causing a damage to the battery pack.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a reinforcement unit of a side sill for an electric vehicle, which can assure impact safety when a side collision occurs and assure a space for installation of a battery pack by applying a reinforcement pipe member that is provided along a length direction of a vehicle body between a side sill inner panel and a side sill outer panel.

One or a plurality of exemplary embodiments of the present invention provides a reinforcement unit of a side sill for an electric vehicle. The side sill is formed of side sill inner panels and side sill outer panels that are respectively provided under opposite ends of a center floor panel. The reinforcement unit includes a reinforcement pipe member provided between the side sill inner panel and the side sill outer panel along a length direction of a vehicle body. A connection apparatus includes a plurality of fixing brackets and a plurality of pipe nuts and fixing the reinforcement pipe member to the side sill inner panel.

The reinforcement pipe member may be formed of an extrusion pipe, and may include an impact load absorbing portion provided in an outer side with reference of a central vertical partition wall and an impact load scatting unit provided in an inner side of the central vertical partition wall.

The impact load absorbing portion may be formed of one horizontal partition wall and two diagonal partition walls between an outer surface of the reinforcement pipe member and the central vertical partition wall.

The impact load scattering unit may be formed of one vertical partition wall and two horizontal partition walls between an inner surface of the reinforcement pipe member and the central vertical partition wall.

The connection apparatus may include a plurality of fixing brackets provided in a plurality of locations along a length direction of the reinforcement pipe member and bonded to the vehicle body and the side sill inner panel through a plurality of vertically extended flanges while being bolt-engaged to the inner surface of the reinforcement pipe member. The apparatus may also include a plurality of pipe nuts provided by vertically penetrating the fixing brackets and the impact load scatting unit of the reinforcement pipe member, and a plurality of engaging bolts vertically engaging the fixing brackets to the impact load scattering unit of the reinforcement pipe member.

The flanges that are vertically extended from the fixing brackets may be provided on the line of the central vertical partition wall of the reinforcement pipe member.

Among the plurality of fixing brackets, one fixing bracket disposed at a front end of the reinforcement pipe member may be bonded to an A pillar through the corresponding flange.

The pipe nuts may be engaged with a battery cross member provided under the center floor panel.

In addition, the connection apparatus may include fixing brackets provided front and rear ends of the reinforcement pipe member and bonded to the vehicle body through vertically extended flanges while being bolt-engaged to the inner surface of the reinforcement pipe member, a plurality of pipe nuts provided by vertically penetrating the impact load scattering unit of the reinforcement pipe member, and a plurality of tapping nuts bonded to the inner surface of the reinforcement pipe member and engaged to bolts that penetrate the side sill inner panel while being bonded to the side sill inner panel by an adhesive.

The flanges that are vertically extended from the fixing brackets may be formed on the line of the central vertical partition wall of the reinforcement pipe member.

The fixing bracket disposed at a front end of the reinforcement pipe member may be bonded to an A pillar.

The pipe nuts may be engaged with a battery cross member that is provided under the center floor panel.

Each if the tapping nuts may include a double flange of which one side flange is bonded to the side sill inner panel and the other side flange is welded to the reinforcement pipe member.

According to the exemplary embodiment of the present invention, the reinforcement pipe member disposed along the length direction of the vehicle body between the side sill inner panel and the side sill outer panel can assure impact safety when a side collision occurs, and enables installation of a battery pack.

In addition, the reinforcement pipe member is engaged by using the connection apparatus and at the same time engaged with the battery cross member so that rigidity can be improved and mounting performance of the battery pack can be assured.

Further, effects that can be obtained or expected from exemplary embodiments of the present invention are directly or suggestively described in the following detailed description. That is, various effects expected from exemplary embodiments of the present invention will be described in the following detailed description.

DETAILED DESCRIPTION OF ILLUSTRATIVE EMBODIMENTS

Hereinafter, exemplary embodiments of the present invention will be described with reference to the accompanying drawings. However, the drawings to be described below and the following detailed description relate to one preferred exemplary embodiment of various exemplary embodiments for effectively explaining the characteristics of the present invention. Accordingly, the present invention should not be limited only to the drawings and description given below.

Figure 1:
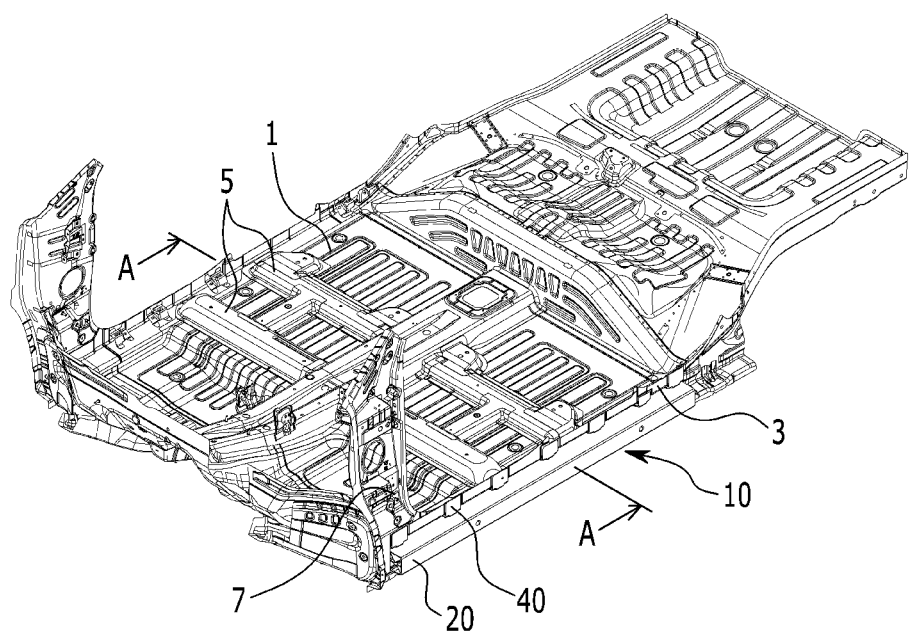
FIG. 1 is a partial perspective view of a vehicle body to which a reinforcement unit of a side sill for an electric vehicle according to an exemplary embodiment of the present invention is applied.
Figure 2:
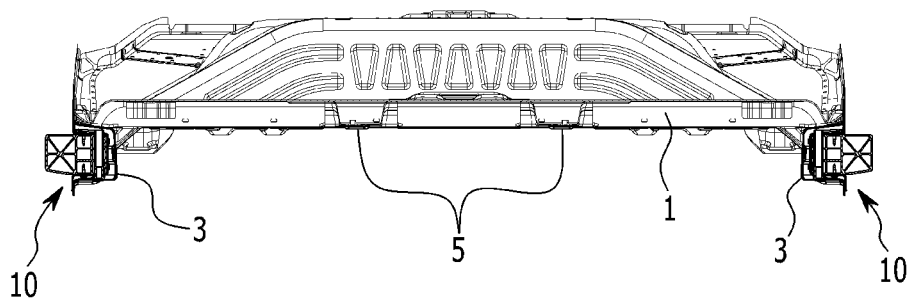
FIG. 2 is a cross-sectional view of FIG. 1, taken along the line A-A.
Figure 3:
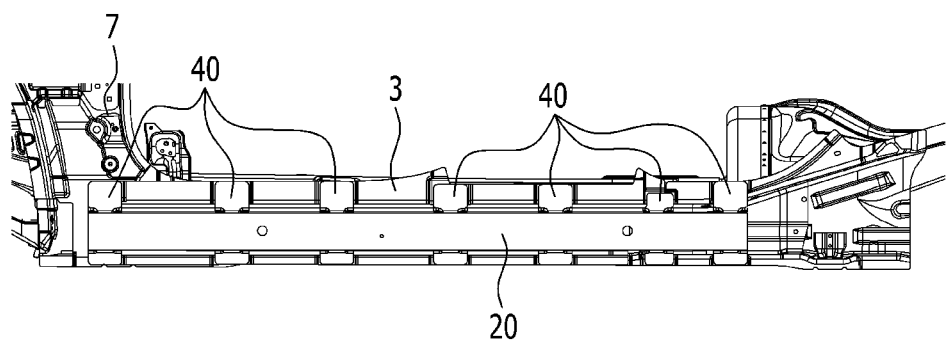
FIG. 3 is a partial side view of the vehicle body to which the reinforcement unit of the side sill for the electric vehicle according to the exemplary embodiment of the present invention is applied.
Figure 4:
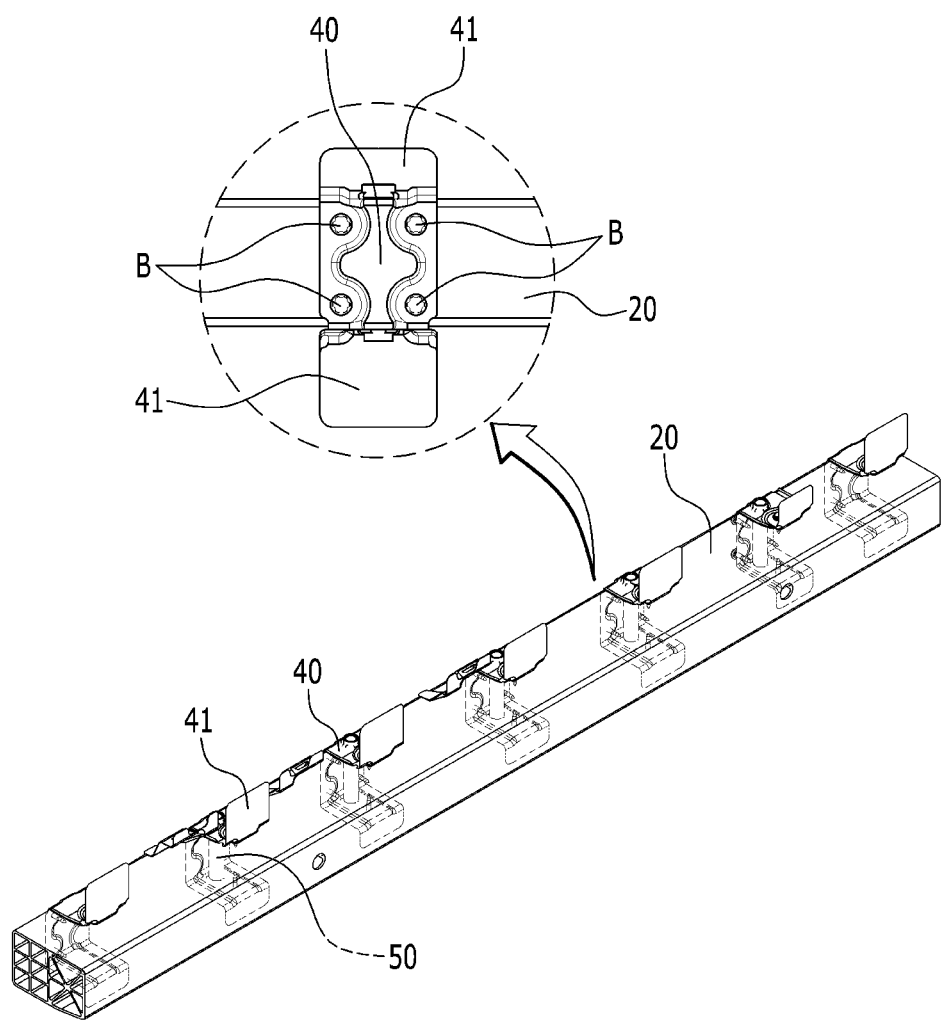
FIG. 4 is a projective perspective view of the reinforcement unit of the side sill for the electric vehicle according to the exemplary embodiment of the present invention.
Figure 5:
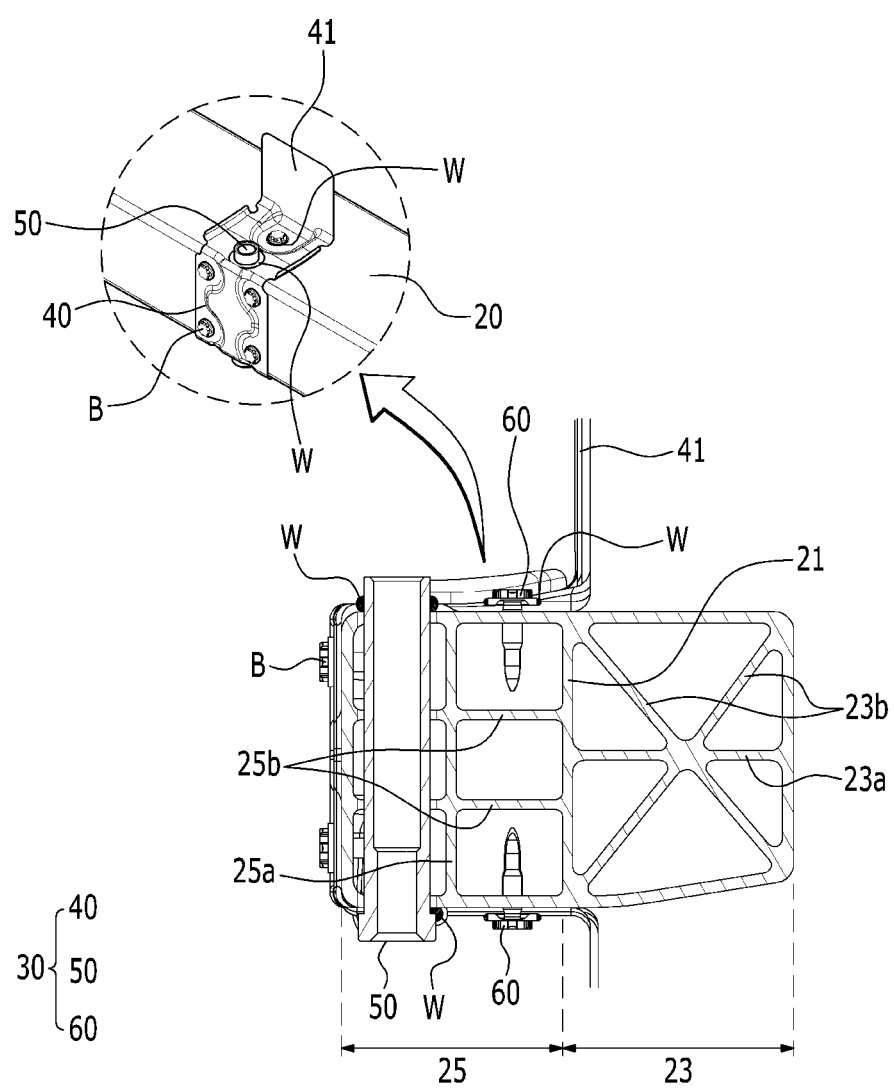
FIG. 5 is a partial enlarged view of the reinforcement unit of the side sill for the electric vehicle according to the exemplary embodiment of the present invention.

FIG. 1 is a partial perspective view of a vehicle body to which a reinforcement unit of a side sill for an electric vehicle according to an exemplary embodiment of the present invention is applied, FIG. 2 is a cross-sectional view of FIG. 1, taken along the line A-A, FIG. 3 is a partial side view of the vehicle body to which the reinforcement unit of the side sill for the electric vehicle according to the exemplary embodiment of the present invention is applied, FIG. 4 is a projective perspective view of the reinforcement unit of the side sill for the electric vehicle according to the exemplary embodiment of the present invention, and FIG. 5 is a partial enlarged view of the reinforcement unit of the side sill for the electric vehicle according to the exemplary embodiment of the present invention.

Referring to FIG. 1 and FIG. 2, a reinforcement unit 10 of a side sill for an electric vehicle according to an exemplary embodiment of the present invention is applied to an under body for the electric vehicle. Hereinafter, the reinforcement unit 10 of the side sill for the electric vehicle will be simply referred to as a reinforcement unit 10.

That is, the reinforcement unit 10 is applied to side sills that are formed of side sill inner panels 3 and side sill outer panels (not shown) in opposite lower sides of a center floor panel 1 of the electric vehicle.

The reinforcement unit 10 is provided below the center floor panel 1 of the electric vehicle, and has a receiving space for a battery (not shown).

In this case, two sheet cross members 5 are disposed on an upper side of the center floor panel 1 in a vehicle width direction.

Each sheet cross member 5 is connected with a battery cross member (not shown) that supports a high-voltage battery pack (not shown) that is provided below the center floor panel 1 through a pipe nut, which will be described later, 50 while forming a ring-shaped structure so as to scatter an impact load from a side collision.

Referring to FIG. 3 to FIG. 5, the reinforcement unit 10 according to the exemplary embodiment of the present invention includes a reinforcement pipe member 20 and a fixing means or connection apparatus 30.

The reinforcement pipe member 20 is interposed in a length direction of the vehicle between the side sill inner panel 3 and the side sill outer panel.

In addition, the reinforcement pipe member 20 is formed as an extrusion pipe.

Specifically, the reinforcement pipe member 20 may be provided as a quadrangular extrusion pipe.

The reinforcement pipe member 20 can be a tube member.

Such a reinforcement pipe member 20 forms an impact load absorption portion 23 at an outer side with respect to a central vertical partition wall 21 formed at a center and an impact load scattering portion 25 at an inner side of the central vertical partition wall 21.

In this case, the impact load absorption portion 23 is formed of one horizontal partition wall 23a and two diagonal partition walls 23b that are provided between the outer side of the reinforcement pipe member 20 and the central vertical partition wall 21.

One horizontal partition wall 23a is disposed at a center of the impact load absorption portion 23, and the two diagonal partition walls 23b cross the center of the horizontal partition wall 23a.

In addition, the bottom side of the impact load absorption portion 23 is inclined upwardly so that a cross-sectional area of the impact load absorption portion 23 is gradually decreased in a vertical direction toward the outside.

When a side collision occurs, the impact load absorption portion 23 absorbs impact energy by being completely collapsed.

The impact load scattering portion 25 is integrally formed with the impact load absorption portion 23, and includes one vertical partition wall 25a and two horizontal partition walls 25b that are disposed between an inner side of the reinforcement pipe member 20 and the central vertical partition wall 21.

In this case, the vertical partition wall 25a may pass centers of the two horizontal partition walls 25b.

In addition, the impact load scattering portion 25 is formed in the shape of a vertically extended rectangle.

The impact load scattering portion 25 may have a partition wall in a horizontal direction for the reinforcement pipe member 20 to resist flexural deformation.

Although it is described that the impact load absorption portion 23 according to the exemplary embodiment of the present invention is formed of the one horizontal partition wall 23a and the two diagonal partition walls 23b and the impact load scattering portion 25 is formed of the one horizontal partition wall 23a and the two diagonal partition walls 23b, but this is not restrictive. The shapes of the partition walls of the impact load absorption portion 23 and the impact load scattering portion 25 may be changed as necessary.

The connection apparatus 30 includes a plurality of fixing brackets 40, a plurality of pipe nuts 50, and a plurality of engaging bolts 60, and fixes the reinforcement pipe member 20 to the side sill inner panels 3 and an A pillar 7.

In this case, a mechanical engaging method applied to the reinforcement unit 10 according to the exemplary embodiments of the present invention may include a flow drilled screw (FDS), Rivtac (brand name), bolting, and the like.

The fixing bracket 40 is provided in plural along a length direction of the reinforcement pipe member 20.

The fixing bracket 40 according to the exemplary embodiment of the present invention is disposed in seven locations along the length direction of the reinforcement pipe member 20, but this is not restrictive. The number of fixing brackets 40 can be modified as necessary.

The fixing brackets 40 are engaged to an inner surface of the reinforcement pipe member 20 through bolts B.

In addition, the fixing brackets 40 are bonded to the side sill inner panel 3 and the A pillar 7 through vertically extended flanges 41.

In this case, each flange 41 is provided on the line of the central vertical partitioning wall 31 of the reinforcement pipe member 20.

Here, among the plurality of fixing brackets 40, one fixing bracket 40 disposed at a front end of the reinforcement pipe member 20 is bonded to the A pillar of the vehicle body through the corresponding flange 41.

That is, among the plurality of fixing brackets 40, fixing brackets 40 that are respectively disposed at front and rear ends of the reinforcement pipe member 20 are respectively bonded to the vehicle body.

In addition, the plurality of fixing brackets 40 disposed between the fixing brackets 40 that are disposed at the front end and the rear end are bonded to the vehicle body while disposing the side sill inner panel therebetween.

Further, the pipe nut 50 is provided in plural and each vertically penetrates the fixing bracket 40 and the impact load scattering portion 25.

That is, the pipe nuts 50 may be provided respectively corresponding to the fixing brackets 40.

Further, the pipe nuts 50 are provided avoiding interference of the bolts B that are engaged to the inner surface of the reinforcement pipe member 20.

The pipe nuts 50 are engaged with the battery cross member that is disposed under the center floor panel 1.

In this case, a circumference of each of the opposite ends of the pipe nut 50 is bonded to a top side and a bottom side of the fixing bracket 40 by welding W.

Bonding the pipe nut 50 by welding W can significantly improve mounting durability of a battery pack that is provided under the center floor panel 1

There are five pipe nuts 50 are provided according to the exemplary embodiment of the present invention, but this is not restrictive. The number of pipe nuts 50 may be modified as necessary.

The engaging bolts 60 vertically engage the fixing brackets 40 that respectively correspond to the impact load scattering portions 25 of the reinforcement pipe member 20.

In this case, the circumferences of the engaging bolt 60, respectively corresponding to the top side and the bottom side of the fixing bracket 40 are bonded to the fixing bracket 40 by welding W.

In such a reinforcement unit 10 according to the exemplary embodiment of the present invention, the reinforcement pipe member 20 and the fixing brackets 40 are engaged at four spots in the inner surface of each fixing bracket 40, the reinforcement pipe member 20 is engaged through the engaging bolts at the top and bottom sides of the fixing brackets 40 while being engaged by the pipe nuts 50 that penetrate the fixing brackets 40 in the vertical direction and then welded W by, and then the reinforcement pipe member 20 is bonded to the side sill inner panel 3 and the A pillar 7 by the flanges 41 of the fixing brackets 40.

Figure 6:
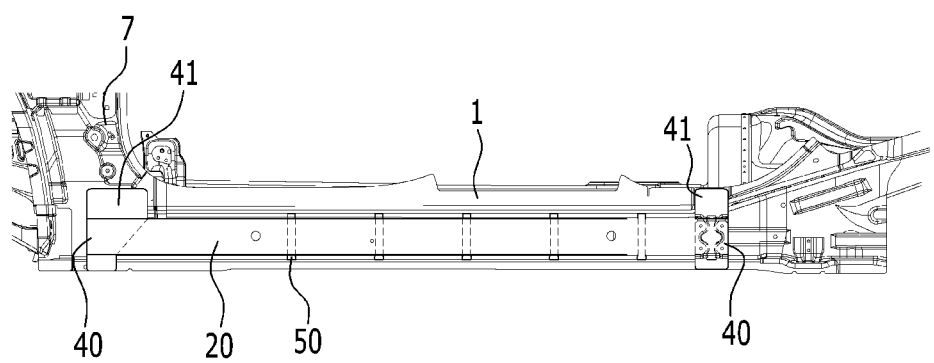
FIG. 6 is a partial side view of a vehicle body to which a reinforcement unit of the side sill for the electric vehicle according to another exemplary embodiment of the present invention is applied.
Figure 7:
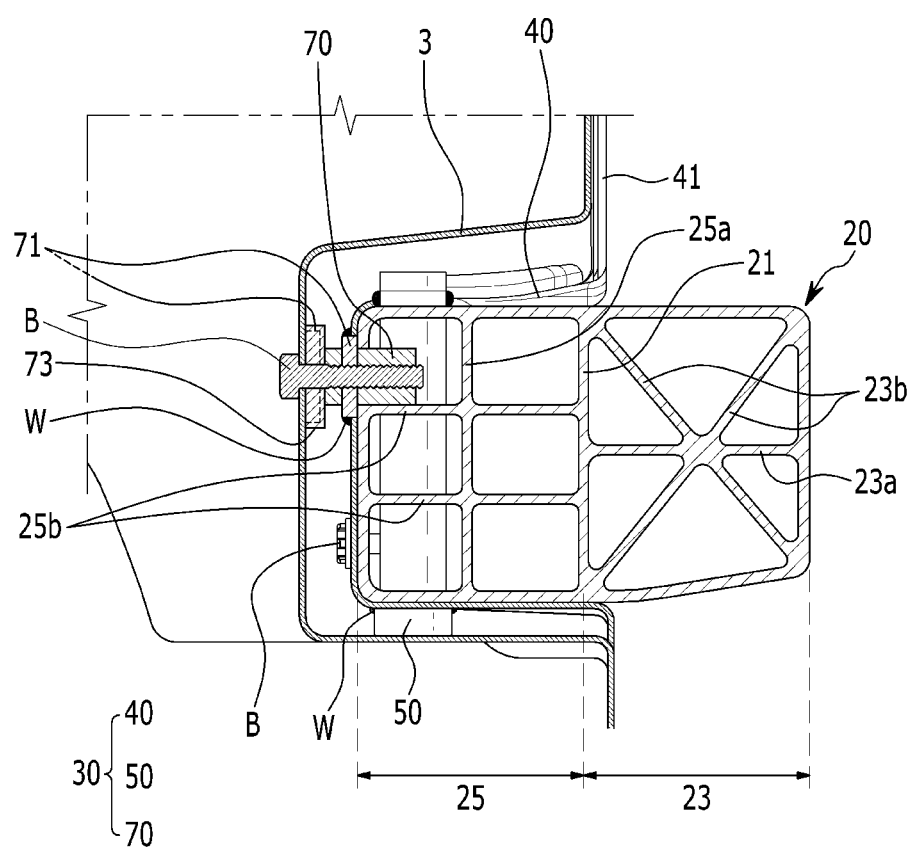
FIG. 7 is a partial enlarged view of the reinforcement unit of the side sill for the vehicle according to the other exemplary embodiment of the present invention.

FIG. 6 is a partial side view of a vehicle body to which a reinforcement unit of a side sill for an electric vehicle according to another exemplary embodiment of the present invention is applied, and FIG. 7 is a partial enlarged view of the reinforcement unit of the side sill for the electric vehicle according to the other exemplary embodiment of the present invention.

Referring to FIG. 6 and FIG. 7, a reinforcement unit 10 according to the other exemplary embodiment of the present invention basically has the shape of the reinforcement pipe member 20 of the previous exemplary embodiment, and a connection apparatus 30 includes fixing brackets 40, pipe nuts 50, and tapping nuts 70.

The fixing bracket 40 according to the present exemplary embodiment is disposed in a front end and a rear end of the reinforcement pipe member 20.

The fixing brackets 40 are engaged to bolts B in an inner surface of the reinforcement pipe member 20.

In addition, the fixing brackets 40 are bonded to the vehicle body through a vertically extended flange 41.

Such a flange 41 of the fixing bracket 40 is formed corresponding to a central vertical partition wall 21 of the reinforcement pipe member 20.

In addition, the pipe nut 50 vertically penetrates an impact load scattering unit 25 of the reinforcement pipe member 20.

The pipe nut 50 is engaged with a battery cross member that is disposed in a lower portion of a center floor panel 1.

Further, the pipe nut 50 is provided while avoiding interference of the bolts B that are engaged to an inner surface of the reinforcement pipe member 20.

In this case, circumferences of opposite ends of each pipe nut 50 are bonded to top and bottom surfaces of the fixing bracket 40 by welding W.

The pipe nut 50 is provided in plural along a length direction of the reinforcement pipe member 20.

There are five pipe nuts 50 are provided in the present exemplary embodiment, but this is not restrictive. The number of pipe nuts 50 may be changed as necessary.

The tapping nut 70 is bonded to the inner surface of the reinforcement pipe member 20.

The tapping nut 70 is bonded to a side sill inner panel 3 by an adhesive 73.

In addition, the tapping nut 70 is engaged by the bolts B that penetrate the side sill inner panel 3.

Such a tapping nut 70 has a double flange 71.

That is, one flange 71 of the tapping nut 70 is bonded to the side sill inner panel 3 and the other flange 71 is bonded by welding W to the reinforcement pipe member 20.

The reinforcement unit 10 according to the present exemplary embodiment engage the reinforcement pipe member 20 and the fixing bracket 40 at four locations in the inner surface of the fixing bracket 40, engage and bond the reinforcement pipe member 20 with the side sill inner panel 3 through a tapping nut 70 that is provided in the inner surface of the reinforcement pipe member 20 while bonding the reinforcement pipe member 20 by welding W by engaging pipe nuts 50 that vertically penetrate the reinforcement pipe member 20, and then the reinforcement unit 10 is bonded to the vehicle body through flanges 41 at vertical ends of the fixing brackets 40.

Thus, according to the exemplary embodiments of the present invention, the reinforcement pipe member 20 that is disposed between the side sill inner panels 3 and the side sill outer panels along a length direction of the vehicle body is applied to the reinforcement unit 10 so that the battery pack can be installed and impact safety from an occurrence of side collision can be assured.

That is, the reinforcement pipe member 20 is made of an extrusion pipe and partitioned into the impact load absorbing portion 23 and the impact load scattering unit 25 by the central vertical partition wall 21, and thus, when a side collision occurs, the impact load absorbing portion 23 is completely collapsed and thus impact energy is absorbed, and the impact load scattering unit 25 scatters the impact energy so that impact safety can be assured.

In addition, the sheet cross members 5 that is provided in the upper side of the center floor panel 1 and the battery cross member that supports the battery pack that is provided in a lower portion of the center floor panel 1 are connected through the pipe nuts 50 while forming a ring-shaped structure, and thus, when a side collision occurs, impact energy is scattered to the sheet cross members 5 and the battery cross member, thereby improving impact safety.

Further, the reinforcement unit 10 engages the reinforcement pipe member 20 by using the plurality of connection apparatus 30 and at the same time is engaged with the battery cross member so that strength can be improved and mounting performance of the battery pack can be assured.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A reinforcement unit of a side sill for an electric vehicle, the side sill comprising side sill inner panels and side sill outer panels that are respectively provided under opposite ends of a center floor panel, the reinforcement unit comprising:
   a reinforcement pipe member to be provided between the side sill inner panel and the side sill outer panel along a length direction of a vehicle body; and
   a connection apparatus comprising a plurality of fixing brackets and a plurality of pipe nuts, the connection apparatus configured to fix the reinforcement pipe member to the side sill inner panel.

2. The reinforcement unit of claim 1, wherein the reinforcement pipe member is formed of an extrusion pipe, and comprises an impact load absorbing portion provided in an outer side with reference of a central vertical partition wall and an impact load scattering unit provided in an inner side of the central vertical partition wall.

3. The reinforcement unit of claim 2, wherein the impact load absorbing portion is formed of one horizontal partition wall and two diagonal partition walls between an outer surface of the reinforcement pipe member and the central vertical partition wall.

4. The reinforcement unit of claim 2, wherein the impact load scattering unit is formed of one vertical partition wall and two horizontal partition walls between an inner surface of the reinforcement pipe member and the central vertical partition wall.

5. The reinforcement unit of claim 2, wherein the connection apparatus comprises:
   the plurality of fixing brackets provided in a plurality of locations along a length direction of the reinforcement pipe member and to be bonded to the vehicle body and the side sill inner panels through a plurality of vertically extended flanges while being bolt-engaged to an inner surface of the reinforcement pipe member;
   the plurality of pipe nuts provided by vertically penetrating the fixing brackets and the impact load scatting unit of the reinforcement pipe member; and
   a plurality of engaging bolts vertically engaging the fixing brackets to the impact load scattering unit of the reinforcement pipe member.

6. The reinforcement unit of claim 5, wherein the flanges that are vertically extended from the fixing brackets are provided on a line of the central vertical partition wall of the reinforcement pipe member.

7. The reinforcement unit of claim 5, wherein, among the plurality of fixing brackets, one fixing bracket disposed at a front end of the reinforcement pipe member is bonded to an A pillar through a corresponding flange.

8. The reinforcement unit of claim 5, wherein the pipe nuts are to be engaged with a battery cross member provided under the center floor panel.

9. The reinforcement unit of claim 2, wherein the connection apparatus comprises:
   fixing brackets provided front and rear ends of the reinforcement pipe member and to be bonded to the vehicle body through vertically extended flanges while being bolt-engaged to an inner surface of the reinforcement pipe member;
   the plurality of pipe nuts provided by vertically penetrating the impact load scattering unit of the reinforcement pipe member; and a plurality of tapping nuts bonded to the inner surface of the reinforcement pipe member and engaged to bolts that each penetrate a corresponding side sill inner panel while being bonded to the corresponding side sill inner panel by an adhesive.

10. The reinforcement unit of claim 9, wherein the flanges that are vertically extended from the fixing brackets are formed on a line of the central vertical partition wall of the reinforcement pipe member.

11. The reinforcement unit of claim 9, wherein each fixing bracket disposed at a front end of the reinforcement pipe member is bonded to an A pillar.

12. An electric vehicle comprising:
a center floor panel;
a side sill comprising side sill inner panels and side sill outer panels that are respectively provided under opposite ends of the center floor panel;
a reinforcement pipe member provided between the side sill inner panel and the side sill outer panel along a length direction of a vehicle body; and
a connection apparatus comprising a plurality of fixing brackets and a plurality of pipe nuts, the connection apparatus fixing the reinforcement pipe member to the side sill inner panel.

13. The electric vehicle of claim 12, wherein the reinforcement pipe member is formed of an extrusion pipe, and comprises an impact load absorbing portion provided in an outer side with reference of a central vertical partition wall and an impact load scatting unit provided in an inner side of the central vertical partition wall.

14. The electric vehicle of claim 13, wherein the connection apparatus comprises:
the plurality of fixing brackets provided in a plurality of locations along a length direction of the reinforcement pipe member and bonded to the vehicle body and the side sill inner panels through a plurality of vertically extended flanges while being bolt-engaged to an inner surface of the reinforcement pipe member;
the plurality of pipe nuts provided by vertically penetrating the fixing brackets and the impact load scatting unit of the reinforcement pipe member; and
a plurality of engaging bolts vertically engaging the fixing brackets to the impact load scattering unit of the reinforcement pipe member.

15. The electric vehicle of claim 14, wherein the flanges that are vertically extended from the fixing brackets are provided on a line of the central vertical partition wall of the reinforcement pipe member and wherein one fixing bracket disposed at a front end of the reinforcement pipe member is bonded to an A pillar through a corresponding flange.

16. The electric vehicle of claim 14, wherein the pipe nuts are engaged with a battery cross member provided under the center floor panel.

17. The electric vehicle of claim 13, wherein the connection apparatus comprises:
fixing brackets provided front and rear ends of the reinforcement pipe member and bonded to the vehicle body through vertically extended flanges while being bolt-engaged to an inner surface of the reinforcement pipe member;
the plurality of pipe nuts provided by vertically penetrating the impact load scattering unit of the reinforcement pipe member; and
a plurality of tapping nuts bonded to the inner surface of the reinforcement pipe member and engaged to bolts that each penetrate a corresponding side sill inner panel while being bonded to the corresponding side sill inner panel by an adhesive.

18. The electric vehicle of claim 17, wherein the flanges that are vertically extended from the fixing brackets are formed on a line of the central vertical partition wall of the reinforcement pipe member and wherein a fixing bracket disposed at a front end of the reinforcement pipe member is bonded to an A pillar.

19. The electric vehicle of claim 17, wherein the pipe nuts are engaged with a battery cross member that is provided under the center floor panel.

20. The electric vehicle of claim 17, wherein the tapping nuts each comprises a double flange of which one side flange is bonded to the side sill inner panel and the other side flange is welded to the reinforcement pipe member.

* * * * *